United States Patent [19]
de Smet

[11] Patent Number: 4,604,327
[45] Date of Patent: Aug. 5, 1986

[54] MULTI-LAYER COMPOSITE-WALL PANEL OR CASE STRUCTURE

[75] Inventor: Gabriel de Smet, Courbevoie, France

[73] Assignee: Union Siderurgigue du Nord et de l'Est de la France, Puteaux, France

[21] Appl. No.: 611,814

[22] Filed: May 18, 1984

[30] Foreign Application Priority Data

May 19, 1983 [FR] France ................. 83 08313

[51] Int. Cl.⁴ .............................. B32B 3/30
[52] U.S. Cl. ................... 428/594; 428/596; 428/638; 384/439; 74/608
[58] Field of Search ......... 428/594, 596, 638; 384/207, 439, 537; 228/214, 175; 219/117.1, 118; 74/606 R, 608; 29/463, 469.5

[56] References Cited

U.S. PATENT DOCUMENTS 2,258,858 10/1941 Meadowcroft ............. 428/594
2,510,727  6/1950 Sussenbach .............. 228/214
3,337,711  8/1967 Garscia ................. 228/175
3,750,267  8/1973 Otto .................... 29/507
4,297,154 10/1981 Keller ................... 428/596

FOREIGN PATENT DOCUMENTS 0006252  1/1978 Japan .................... 219/118

OTHER PUBLICATIONS

Allen, "Metallurgy Theory and Practice", American Technical Society, Chicago, 1969, p. 619.

Primary Examiner—L. Dewayne Rutledge
Assistant Examiner—Robert L. McDowell
Attorney, Agent, or Firm—Cushman, Darby & Cushman

[57] ABSTRACT

The composite-wall panel or case structure comprises a wall formed by at least two shaped sheets 5, 6 which have regions in which confronting surfaces are in adjoining relation and interconnected by bonding or spot welding, and regions in which hollow bodies are formed between said confronting surfaces so as to impart a required rigidity to the structure. A method is disclosed for producing said panel or case structure. Application in the automobile industry.

14 Claims, 7 Drawing Figures

MULTI-LAYER COMPOSITE-WALL PANEL OR CASE STRUCTURE

The present invention relates to a multi-layer composite-wall panel or case structure, and in particular to metal panels or cases and to a method of producing same.

Up to the present time, mechanical cases were mainly produced by casting steel or light alloys, and had to include sufficiently thick walls to resist the forces applied thereto and allow the casting. The direct consequence of these thick structures is the relatively high weight of these units.

Further, these units are constructed by casting at rates which are consequently dependent on this type of operation.

Moreover, in the production of bodywork or other case parts of sheet metal, in particular in the automobile industry, relatively thick sheets are used for imparting to the unit sufficient rigidity. However, the drawback of such sheets is their relatively great weight in proportion to the thickness of the sheet.

An object of the present invention is to provide in particular cases or panels having composite walls which allow high production rates while reducing the weight of the unit for a given strength.

The present invention therefore provides a case or metal structure having a composite wall, wherein the wall is formed by at least two shaped sheets comprising regions in which the confronting surfaces are in adjoining relation and rendered rigid with each other by bonding and spot-welding, and regions in which hollow bodies are formed between said confronting surfaces so as to impart the required rigidity to the structure.

The shaped sheets are in particular press-formed steel sheets having a high yield point, i.e. a yield point of 80 to 100 kg/mm$^2$ and more.

The cases may have a substantially flat or hollow shape, such as a spherical or cylindrical or other suitable shape for containing a mechanism which must be protected or lubricated, etc. . . .

The essential feature of the present invention resides in the fact that the composite wall of the structure comprises an assembly of metal sheets which are bonded to each other by their adjoining confronting surfaces and include on these surfaces a number of discrete spot-welds at a judiciously chosen spacing. Between these adjoining confronting surfaces, the sheets form hollow bodies which are adapted to impart the required rigidity to the wall of the case or the structure. Two or more sheets may be associated in a sandwich, depending on the structure.

Another object of the invention is to provide a method for producing case or panel structures having a composite wall, which comprises assembling along their main surfaces at least two metal sheets which are shaped with interposition of a layer of a bonding material, subjecting the laminated structure thus formed to a spot welding step and thereafter to a final treatment for activating the bonding material.

The bonding material is an adhesive previously applied to at least the internal surface of the laminated structure of at least one sheet forming the sandwich. This adhesive may be in the form of a film previously deposited on one of the surfaces of the sheet which thus allows its handling in an industrial step.

This adhesive may be rendered conductive of electricity by a suitable filler for the following use, depending on the manner of carrying out the method described hereinafter.

Further, in a modification of the invention, the sheet is provided with a first surface layer of a material having a low melting point, such as for example zinc, lead or tin or alloys thereof.

This material having a low melting point may cover both surfaces of each sheet or at least the internal surfaces of the laminated structure.

When the sheet also includes a coating of adhesive, the latter is applied to the layer of material having a low melting point.

The step for forming spot welds may be effected in accordance with two manners of proceeding.

According to a first manner of proceeding, the spot welding is effected by resistance welding.

When it concerns relatively thin metal sheets (having a thickness of less than 0.8 mm), a high-current resistance welding is not recommended since it produces an excessive indentation which may perforate the sheet and in any case has an adverse effect on the surface condition of the sheets.

In this case, a low-current resistance welding is employed which produces a temperature just sufficient to melt the material having a low melting point, such as zinc, but insufficient to produce a substantial modification of the mechanical properties of the sheet.

In the case of for example zinc, it is sufficient to produce a temperature at least equal to about 420° C. Apart from the spot-welds formed, the presence of Zn protects the sheet against corrosion.

An even lower current can be used and a sheet which does not have said material having a low melting point may be used so as to obtain a temperature which is just sufficient to produce a rapid polymerization of the bonding material in the form of spots which are in this case of large area and perform a function similar to the spot-welds mentioned hereinbefore. It is of course necessary to employ in this case an adhesive which is conductive of electricity.

According to a second manner of proceeding, the spot-welding is effected by induction so as to produce, by conduction in the median region of the laminated structure, a temperature adapted to the desired transformation, namely the melting of the material having a low melting point, rapid polymerization of the adhesive.

In the case of induction heating of the adhesive, the adhesive does not need to be conductive of electricity.

The area and the shape of the "spots" are varied in accordance with the method employed and the number of spots desired to be produced.

At the end of this step, the sheets are brought together and the laminated structure is then subjected to a final treatment so as to activate the adhesive material, i.e. polymerize the adhesive throughout the area of the junction planes.

The adhesive may be in particular a thermosetting material whose polymerization is effected in an oven at a conventional temperature of about 200° C.

The manufacturing method described hereinbefore for forming the spot-welds at low temperature permits the obtainment of invisible spots, which is essential to the obtainment of a correct surface appearance for automobile bodywork, and a handling of the composite wall parts as soon as the spot-welds are formed, and before the final activation of the adhesive which may be achieved in painting ovens.

Further, the presence of the film of adhesive in the form of a sandwich constitutes a sound and heat insulation screen.

The invention will be described hereinafter in more detail with reference to the accompanying drawings, which show only two embodiments of the invention.

In these drawings:

FIG. 3 is a view of the other side wall constituting the case shown in FIG. 1;

Figure 1:
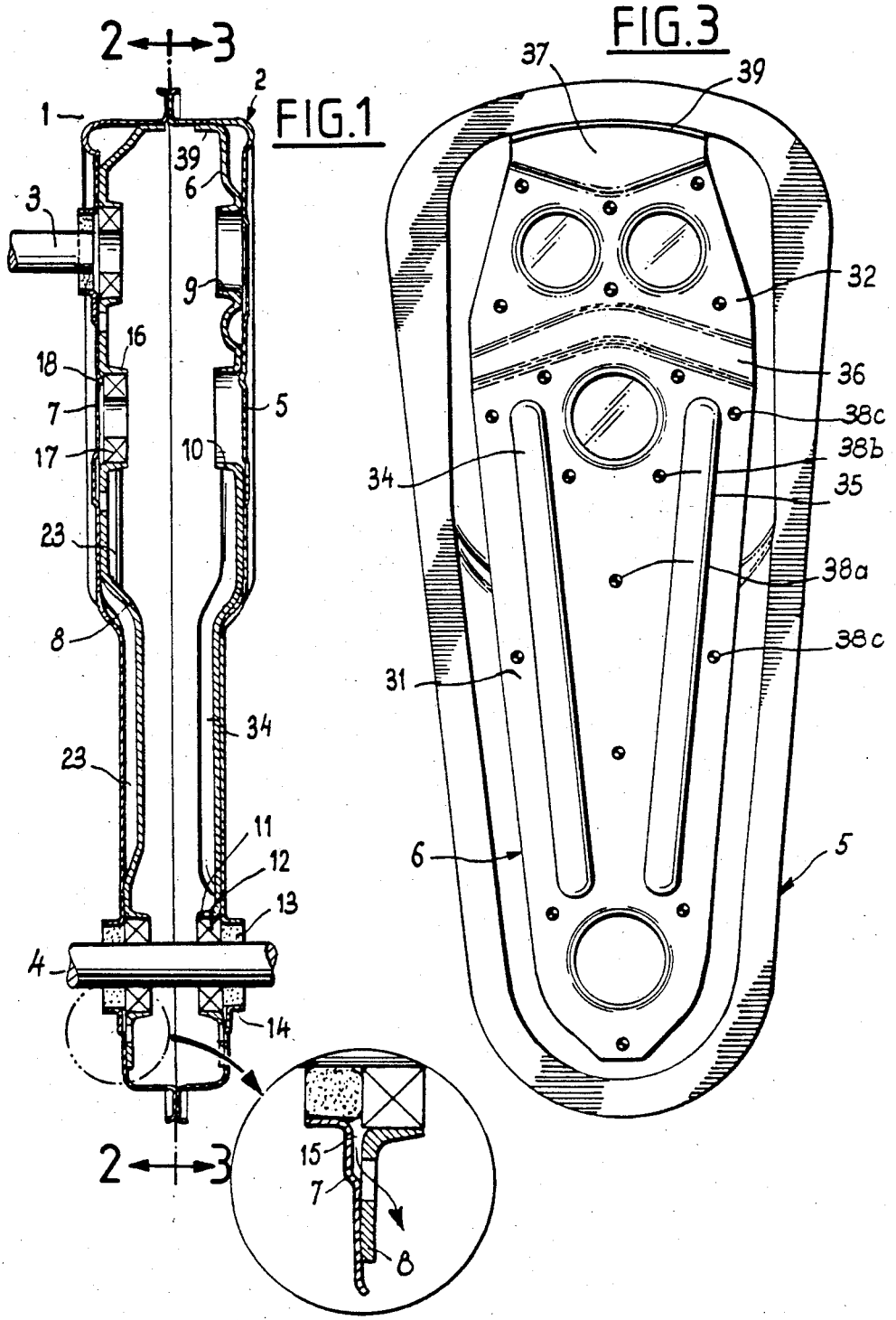
FIG. 1 is an elevational and sectional view of a substantially flat-shaped case.

The case or housing shown in FIG. 1 is a case for a motorized hoe, i.e. an agricultural or market-gardening machine. This case has two wall units 1 and 2 which are assembled along their peripheral portions defining an internal volume in which are located the means for trasmitting power from an input shaft 3 connected to a drive unit (not shown) to an output shaft 4 on which the farming or cultivating tools (not shown) are mounted. The two wall units are interconnected by conventional means, such as screw-and-nut means or possibly by adhesion and spot-welding when the weight of the unit is desired to be reduced.

The wall unit 2 comprises two walls made from a press-formed steel sheet, one wall 5 forming the outer shell and another wall 6, disposed on the inner side of the case, constituting the rolling bearing-carrying wall.

Further, the wall unit 1 comprises two distinct walls, namely a wall 7 constituting the outer shell and a wall 8 disposed inside the case and forming the rolling bearing-carrying wall.

The side wall unit 2 shown in FIG. 3 comprising two walls 5 and 6 includes substantially planar regions 31, 32 in which the confronting surfaces of the walls 5, 6 are closely assembled and in adjoining relation to each other. These regions 31, 32 are separated by hollow bodies 34, 35, 36 and 37, such as ribs. In the closely-assembled flat regions, the partition walls 5 and 6 are spot-welded together, as shown by the reference numerals 38a, 38b, 36c, etc. . . . and adhered to each other.

In the region of the hollow open body 37, as can be seen in FIG. 1, the rolling bearing-carrying wall 6 is fixed to the side of the wall 5 constituting the outer shell, by a flange 39 so as to overcome the tension effects of the assembly. This fixed assembly is achieved by adhesion and spot-welding.

As shown in FIG. 1, the partition wall 6 carrying the rolling bearings defines bearing housings 9 and 10 receiving rolling bearings (not shown) of the means trasmitting power between the input shaft 3 and the output shaft 4. The bearing housings 9 and 10 project inwardly and do not open onto the exterior, since the partition wall 5 constitutes a continuous outer shell disposed in facing relation to these housings. On the other hand, the bearing housing 11 receives a rolling bearing 12 mounted on the output shaft 4 and opens onto the exterior through a sealing element 13 received in a collar 14 defined in the wall 5 constituting an outer shell and projecting outwardly.

The housings of the bearing-carrying wall shown in FIG. 1 are of different design so as to show arrangements adapted to overcome special effects.

Thus, in respect of the bearing housing 11, the support for the rolling bearing 12 is provided by different diameters between the bearing housing 11 and the collar 14.

A bearing housing 16 carrying a rolling bearing 17 has been shown on the side wall 1 for a shaft of the means for transmitting power (not shown). This bearing 17 bears against raised bosses 18 which project inwardly of the case and are formed in the outer wall 7.

Figure 2:
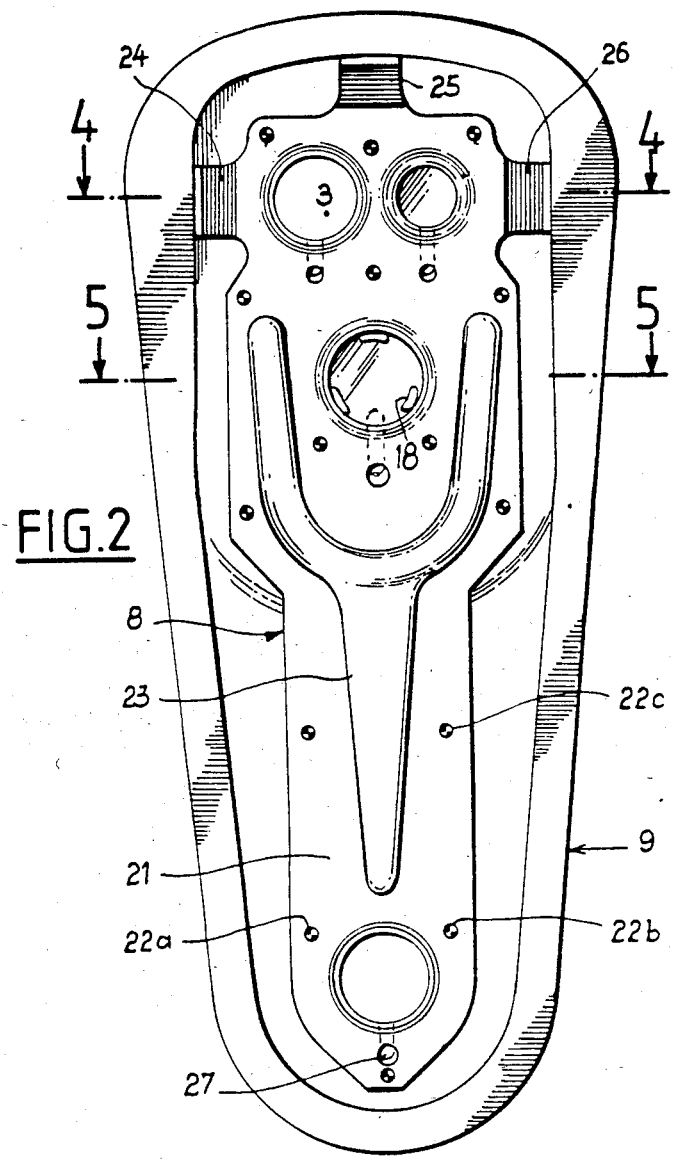
FIG. 2 is a view of one of the two side walls constituting the case shown in FIG. 1.

The side wall unit 1 shown in FIG. 2 formed by two walls 8 and 9 includes regions 21 in which the confronting planar surfaces of the assembled walls 8 and 9 are spot-welded at 22a, 22b, 22c, etc. . . . and adhered together.

A hollow body constituting a rib 23 having a Y-shape is formed in a substantially central part relative to the region 21. This hollow body is closed, in contrast to the hollow bodies 24, 25 and 26 formed in the upper part of the side wall unit 1. The hollow bodies 24, 25, 26 are of the same type as those described for the hollow body 27 of the side wall unit shown in FIG. 3 and perform the same function.

Figures 4, 5:
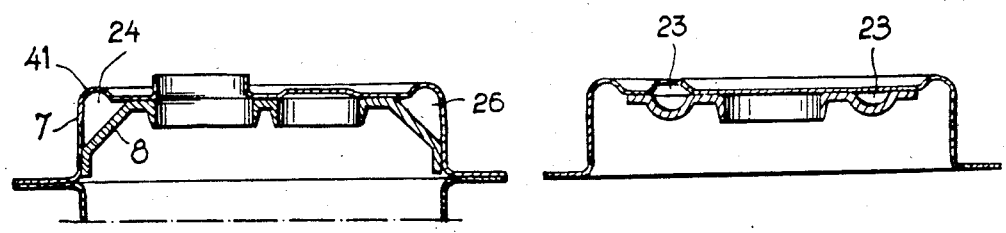
FIGS. 4 and 5 are cross-sectional views at two different levels of the side wall shown in FIG. 2.

FIG. 4 is a horizontal sectional view of the side wall of FIG. 2, and the hollow bodies 24 and 26 defined between the walls 7 and 8 can be seen.

FIG. 4 also shows a press-formed rib 41 intended to render the surface more taut.

In FIG. 5, which is a horizontal sectional view, there can be seen in the region of the input shaft 3 a closed hollow body 23 formed in the two upper branches of the Y.

FIG. 1 shows in detail the space 15 constituting a passageway formed between the wall 7 constituting the outer shell and the bearing-carrying wall 8. This passageway 15 communicates with an orifice 27, shown in FIG. 2, for the return of oil issuing from the rolling bearing in the case.

The walls may have equal or different thicknesses, depending on their function in the composite wall.

According to another embodiment of the invention, the case may be a spherical or cylindrical case.

In particular, there will be described hereinafter, by way of an illustration, a cylindrical case which is a rolling bearing case constituting a non-driving wheel hub.

Figure 6:
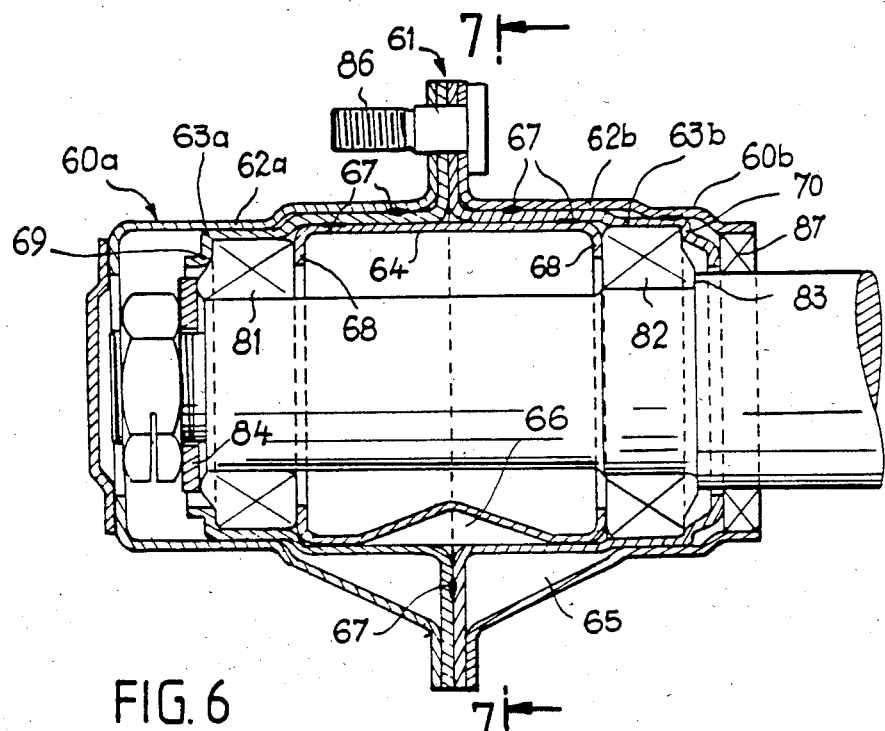
FIG. 6 is a vertical axial sectional view, taken on line 6—6 of FIG. 7, of a wheel-hub.

The wheel hub shown in FIG. 6 has a composite wall including at least three individual walls which are assembled and rendered rigid with each other by the method of the present invention employing adhesion and spot-welding.

This hub comprises two semi-shells 60a, 60b having the shape of a cylindrical sleeve including a flange 61. Each semi-shell comprises an outer wall 62a, 62b and an intermediate wall 63a, 63b which are fitted one inside the other, the intermediate wall 63a, 63b being fitted inside the outer wall 62a, 62b. The two semi-shells 60a, 60b are assembled by their flange 61, so that, in the region of the flange, the thickness of the composite wall is multiplied by four.

Inside the median part of the two semi-shells 60a, 60b assembled together, is placed an annular ring having a single wall constituting an interior wall 64 which is superimposed on the intermediate walls 63a, 63b, so as to form in this region a composite wall of the hub which has a triple thickness. This wall 64 is superimposed on the walls 63a, 63b and 62a, 62b and forms a sandwich therewhith which is rendered rigid by the adhesion and spot-welding method.

The various walls 62a, 62b and 64 are not exactly cylindrical but include bosses which define hollow bodies which are one of the component elements of case structures having composite walls according to the present invention.

Figure 7:
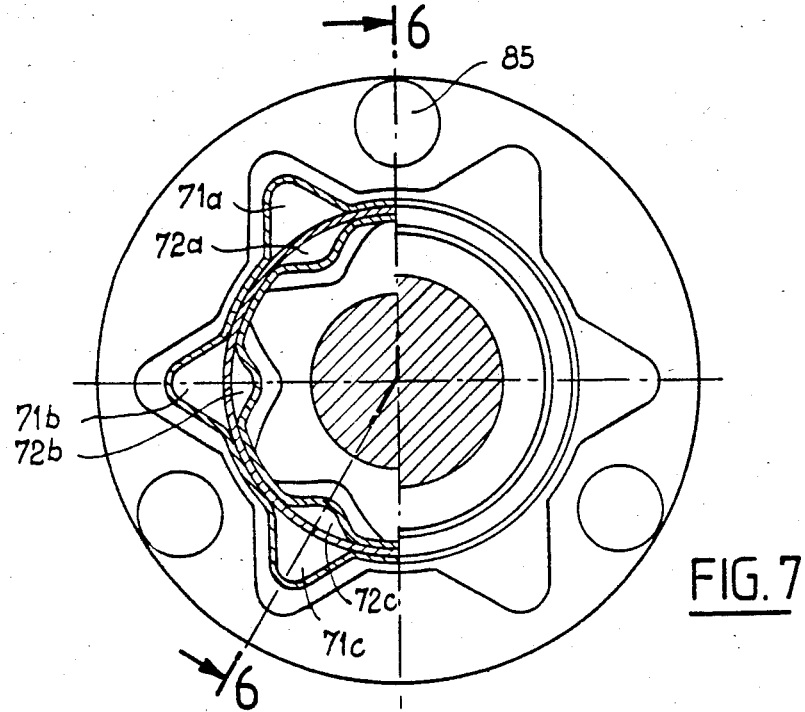
FIG. 7 is a semi-end elevational view and a semiradial sectional view taken on line 7—7, of the hub shown in FIG. 6.

Thus, as shown in FIG. 7, the wall 62b, which is shown in section on line 7—7 of FIG. 6, forms bosses 71a, 71b, 71c which extend radially in an even angular spacing which is 30° in the illustrated embodiment.

These bosses 71a, 71b, 71c extend outwardly of the hub.

The wall 64 also forms bosses 72a, 72b, 72c similar to the boss 61 but extending inwardly and disposed radially in confronting relation to the latter.

The bosses 71 respectively correspond to the hollow bodies 65 of FIG. 6, and the bosses 72 to the hollow bodies 76 of FIG. 6.

The walls 63a, 63b are, in their part outside the flange 61, cylindrical and have surfaces which are closely assembled with the walls 62a, 62b, and 64 and rendered rigid with the latter by spot-welds shown at 27 and by adhesion.

Likewise, in respect of the four walls of the flange 61, spot-welds 67 are evenly spaced apart on the planar peripheral surfaces.

The walls 64 includes inwardly bent flanges 68 which act as positioning and maintaining means with flanges having a shoulder 69 and 70 provided respectively in the walls 63a and 63b for the positioning of ball bearings 81, 82.

These ball bearings 81, 82 are mounted on the wheel stub-axle and also positioned on the latter by various shoulders 83 and a stop washer 84.

The composite flange 61 has orifices 85 for the passage of studs 86 for fixing various elements connected to the hub, such as the brakes and the wheel rim.

Sealing means in the form of a ring 87 positioned between the end of the wall 62b, on one hand, and the end of the flange 70 of the wall 63b, on the other hand, and the stub-axle are provided in the conventional manner.

The wheel hub constructed in this way comprises composite walls which have three or four thicknesses whose confronting surfaces are closely assembled in the form of a sandwich and which are interposed between the hollow bodies imparting the required torsional rigidity to the hub.

This type of hub has the advantage of a very interesting light weight for the unsuspended masses of a motor vehicle. Note, moreover, that it permits a positioning and maintenance of the rolling bearings by means of judiciously arranged flanges in the various walls formed by the press-forming of a metal sheet. As the various walls are obtained by a press operation, it is possible to employ high production rates and consequently produce the hub by the adhesion and spot-welding method. According to the present invention, the superimposed confronting surfaces assembled as a sandwich must be, on one hand, adhered and, on the other hand spot-welded with judiciously arranged spot-welds. Indeed, the adhesion does not provide sufficient resistance to separation of the assembled parts and the spot-welding results in vibrations of the sheets. When these two means are combined, the desired resistance to separation and the absence of vibrations in the walls of the case which become closely secured to each other and homogeneous, can be achieved.

The composite wall structure according to the invention may, moreover, be employed for producing panels in a motor vehicle such as bonnets, lids or doors or any other vehicle body element.

What is claimed is:

1. A composite-wall case structure, comprising two assembled composite wall panels, each comprising at least two shaped walls having regions in which confronting surfaces thereof are in adjoining relation to each other and interconnected by bonding and spot-welding and regions in which hollow bodies are formed between said confronting surfaces for imparting a required rigidity to the panel, one of said walls constituting an outer shell and the other wall a a rolling bearing-carrying wall located inside said case structure, said walls defining apertures for the passage of shafts.

2. A structure according to claim 1, wherein said walls are press-formed steel sheets.

3. A structure according to claim 1, wherein said rolling bearing-carrying wall defines bearing housings which are an integral part of said bearing-carrying wall, and including rolling bearings supported by said bearing housings.

4. A structure according to claim 1, wherein said wall constituting an outer shell defines annular flanges which are an integral part thereof and receive sealing elements.

5. A structure according to claim 4, wherein an annular flange of said wall constituting an outer shell and a bearing housing of said rolling bearing-carrying wall have different diameters so as to provide a rolling bearing support.

6. A structure according to claim 3, wherein said wall constituting an outer shell defines, in facing relation to a peripheral portion of the bearing housings of the rolling bearing-carrying wall, raised bosses which project inwardly of the case for supporting the corresponding rolling bearing.

7. A structure according to claim 3, wherein said walls constituting an outer shell and said rolling bearing-carrying walls define therebetween, in a region of said bearing housings, passageways for the return of lubricating oil.

8. A structure according to claim 1, wherein said case structure is a substantially cylindrical rolling bearing case comprising two semi-shells which are each in the shape of a cylindrical sleeve having a flange and are assembled by said flanges, each semi-shell having an outer wall and an intermediate wall which are fitted one inside the other, and an inner wall in the shape of an annular ring superimposed inside the intermediate walls in a median part of the two semi-shells.

9. A structure according to claim 8, including hollow bodies formed between confronting surfaces of the outer, intermediate and inner walls and defined by bosses which extend radially in an evenly angularly spaced-apart disposition and are respectively formed between said outer wall and said intermediate wall and between said inner wall and said intermediate wall.

10. A structure according to claim 8, wherein said inner wall has inwardly-folded flanges and said intermediate walls have shoulder-defining flanges which constitute, with said inwardly-folded flanges, means for positioning and maintaining rolling bearings.

11. A method for producing a composite-wall case structure comprising two assembled composite wall panels, each comprising at least two shaped walls having regions in which confronting surfaces thereof are in adjoining relation to each other and interconnected by bonding and spot-welding and regions in which hollow bodies are formed between said confronting surfaces for imparting a required rigidity to the panel, one of said walls constituting an outer shell and the other wall constituting a rolling bearing-carrying wall located inside said case structure, said walls defining apertures for the passage of shafts, said method comprising providing at least two shaped walls each having a main surface, assembling said walls on their main surfaces, with interposition of a layer of a bonding material so as to constitute a laminated structure, and subjecting said laminated structure to a spot-welding step and thereafter to a final treatment for activating said bonding material.

12. A method according to claim 11, wherein said bonding material is an adhesive previously applied on at least the main surface of at least one wall of said laminated structure.

13. A method according to claim 11, wherein said spot-welding is produced by a low-temperature electric resistance welding.

14. A method according to claim 11, wherein said spot-welding is produced by electric induction.

* * * * *